United States Patent [19]

Yamaue et al.

[11] 4,340,128
[45] Jul. 20, 1982

[54] OFFSET TYPE TRACTOR

[75] Inventors: Yasunobu Yamaue, Izumi; Tetsuo Ishioka, Wakayama, both of Japan

[73] Assignee: Kubota, Ltd., Japan

[21] Appl. No.: 151,097

[22] Filed: May 16, 1980

Related U.S. Application Data

[63] Continuation of Ser. No. 891,764, Mar. 30, 1978, abandoned.

[30] Foreign Application Priority Data

Jul. 15, 1977 [JP] Japan .............................. 52/94626[U]
Oct. 27, 1977 [JP] Japan .......................... 52/145466[U]

[51] Int. Cl.$^3$ ........................ B60K 17/00; B60D 1/10
[52] U.S. Cl. ...................................... 180/900; 74/479;
74/480 R; 180/53 C; 180/315; 280/461 A; 280/472
[58] Field of Search .................... 180/900, 53 C, 315, 180/333; 172/47, 302, 470, 125, 114; 74/479, 480 R; 280/461 A, 472; 244/220

[56] References Cited

U.S. PATENT DOCUMENTS

| | | | |
|---|---|---|---|
| 2,368,156 | 1/1945 | Orelind et al. | 172/302 |
| 3,023,818 | 3/1962 | Miller et al. | 180/53 C |
| 3,181,388 | 5/1965 | Riddy | 74/479 |
| 3,856,331 | 12/1974 | Bogdanovich | 280/461 A |
| 4,043,220 | 8/1977 | Kolb | 74/543 |
| 4,051,902 | 10/1977 | Van der Lely | 172/52 |
| 4,211,298 | 7/1980 | Tanaka et al. | 180/900 |

Primary Examiner—Joseph F. Peters, Jr.
Assistant Examiner—Donn McGiehan

[57] ABSTRACT

An offset type tractor with attachment of a first working implement longitudinally between front and rear wheels and of a second working implement rearwardly of the rear wheels, with the possibility of separate, independent maneuvering as well as common, simultaneous maneuvering modes of raising and lowering the first and the second implements. A mechanism for raising and lowering the first implement is disposed so as not to impair a clear front view from the offset type tractor.

7 Claims, 6 Drawing Figures

OFFSET TYPE TRACTOR

This is a continuation of application Ser. No. 891,764, filed Mar. 30, 1978, now abandoned.

BACKGROUND OF THE INVENTION

1. Field of the Invention

This invention relates to an offset type tractor with a longitudinal rigid main frame unit including a prime mover assembly connected to a transmission gearing case for running travel, the unit extending offset to one lateral side of the longitudinal center line of the tractor, and having an operator's seat substantially near the longitudinal center line, thus providing a clear front view for the seated operator; the unit being provided with ample lower space longitudinally in between front and rear wheels and thus adapted for possible attachment of a first working implement in the said space as well as a second working implement rearwardly of the rear wheels, with power-driven raising and lowering of both of the first and the second implements.

2. Description of the Prior Art

In tractors of the type described above, it has been the practice to raise and lower the first and the second implements commonly en bloc or in full interlocking with each other. Such tractors have drawbacks, however, in that the mechanism for attaching the implements must somehow be specially modified when, for instance, different kinds of working implements are attached as the first and the second implements on respective levels different with each other, and in that when the implements are commonly raised and lowered, for instance, automatically in response to field undulations as sensed at the first implement, for compensating the undulations, then the second implement would dig too far into the soil if traveling on generally concave terrain or would come out off the soil if on convex terrain, thus in either case impairing the proper performance of such second implement.

SUMMARY OF THE INVENTION

This invention is characterized by providing a tractor of the type described above, in which separate raising-and-lowering drive power apparatuses and separate raising-and-lowering maneuvering means pertaining thereto are provided for the first and the second implements, respectively, and the raising-and-lowering drive power apparatus for the first implement is disposed on the side of the main frame unit remote from the operator's seat.

It is thus made possible to raise and lower the first and the second implements arbitrarily either separately from and independently of each other or simultaneously together, enabling, therefore, easy readjustment of the respective levels of the first and the second implements, freely as desired, without requiring any special modification of the mechanism for attachment, as well as to travel the tractor with the first and the second implements properly maneuvered in response to field undulations, if any, by separately raising and lowering the implements independently of each other, thus avoiding too deep digging into the soil or coming out of the soil of one implement as would conventionally be seen at such undulations due to raising and lowering of the other implement in response to the undulations, as mentioned above; and thus realizing high working performance. Furthermore, the disposition of the raising-and-lowering drive power apparatus for the first implement on the side of the main frame unit remote from the operator's seat, will be no obstacle for forward viewing of the seated operator and retains the advantage of a wide clear front view inherent to offset type tractors.

The main object of this invention is thus to realize high working performance of the offset type tractor by providing the first and the second implements adapted for raising and lowering arbitrarily either separately from and independently of each other or simultaneously, while avoiding restriction of the wide clear front view of the seated operator.

Another object of this invention is to provide means for raising and lowering the first and the second implements of such tractor, simply with one hand.

Still another object of this invention is to provide means for attaching the second implement to such tractor, in good balanced alignment with the tractor while securing proper operative connection.

Yet further objects and advantages will become clear from the following detailed description of this invention.

DESCRIPTION OF THE PREFERRED EMBODIMENTS

Figure 1:
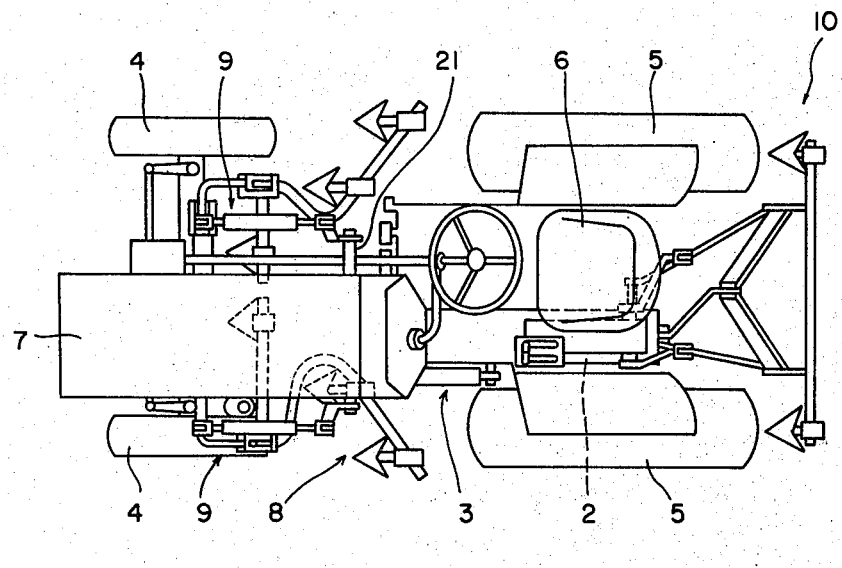
FIG. 1 is an overall plan view of the offset type tractor according to this invention.

The tractor shown in FIGS. 1–5 has a rigid main frame unit generally designated at 3, including a prime mover assembly 1 with transmission gearing case 32 accommodating transmission gearing 2; and a pair of dirigible or directional front wheels 4 and a pair of power drive rear wheels 5 journaled on front and rear axles, respectively, of the main frame unit 3. The main frame unit 3 is disposed offset to one lateral side of the longitudinal center line of the tractor, and an operator's seat 6 is oppositely offset, on the side opposite to said one side of the longitudinal center line of the main frame unit 3, whereby a hood 7 covering the prime mover assembly 1 does not provide any substantial obstacle to the wide clear front view of the seated operator. Ample space is provided underneath the main frame unit 3 and the operator's seat 6, longitudinally between the front and rear wheels 4 and 5.

On the main frame unit 3 are attached: a first cultivator 8 disposed in the space longitudinally between the front and rear wheels 4 and 5, with provision for power-driven raising and lowering via a lateral pair of 4-articulate-member link mechanisms 9; and a second cultivator 10 disposed rearwardly of the rear wheels 5, for cultivating tread tracks or ruts thereof, with provision for power-driven raising and lowering via a link mechanism 13 comprising a lateral pair of lower links 11 and a top link 12.

Figure 3:
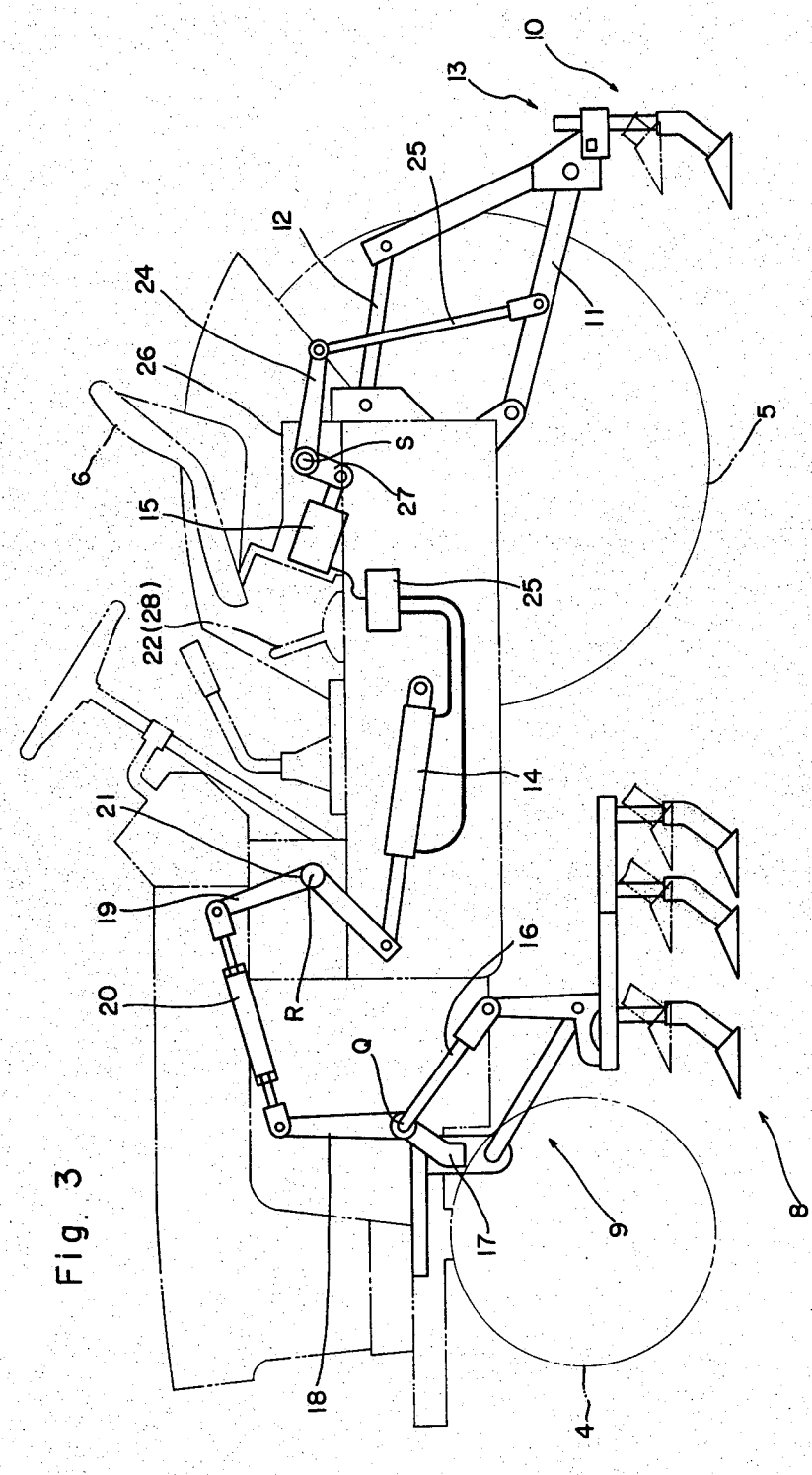
FIG. 3 is a side elevation view of the portion of the tractor essential to this invention, showing how the cultivating implements and actuating oil hydraulic cylinders therefor are mounted, together with operating system therefor.

A hydraulic cylinder 14 is operatively connected to the link mechanisms 9, and another hydraulic cylinder 15 is operatively connected to the link mechanism 13, in order to raise and lower the two cultivators 8 and 10 arbitrarily either separately from and independently of each other or simultaneously, as is now described in further detail hereunder:

Referring to FIG. 3, an upper constituent link 16 of each of the 4-articulate-member link mechanisms 9 is integral with an upwardly extending arm 18, and a middle articulate point of the integral entity is pivotally supported on a fixed bracket 17 for free rocking around a transverse axis Q. An intermediary connecting rod means 20 of adjustable length articulately connects the top end of the arm 18 to a lift arm 19 to be described below in further detail. FIG. 3 shows one 4-articulate-member link mechanism 9 on the left hand lateral side of the tractor and the description has been made with reference thereto, but it should be noted that there is provided also a mate of identical construction on the right hand side of the tractor, thus providing the lateral pair of the link mechanisms 9 as mentioned before. The lift arm 19 is provided also on each of the lateral sides, and in fact the two lift arms 19 laterally outwardly of the hood 7 on either side thereof are formed to be integral with a transverse rod 21 extending through the hood 7, as journaled for free rocking of such integral entity around axis R. The lift arm 19 on the lateral side of the hood 7 remote from the operator's seat 6 is operatively connected to the working piston of cylinder 14 singly provided only on the same lateral side of the main frame unit 3, thus remote from the operator's seat 6, and raising-and-lowering operating means 22 is provided on the main frame unit 3 near the operator's seat 6, to operate a control valve assembly 23 and thus raise or lower the cultivator 8 with the amount and direction of the movement thereof corresponding to the amount and direction of the maneuvering operation.

The lower links 11 in the lateral pair rearwardly of the rear wheels 5 are each connected to respective lift arms 24 via intermediary connecting rods 25 and 25a (FIG. 5), respectively. The two lift arms 24 are formed to be integral with rocking crank means 27 journaled on a cylinder housing 26, provided on the main frame unit 3, for free rocking around a transverse axis S. The crank means 27 is operatively connected to the working piston of cylinder 15, and raising-and-lowering operating means 28 is provided on the main frame unit 3 near the operator's seat 6, for operating the control valve assembly 23, for moving the first implement 8 and which therefore forms a common assembly in the illustrated instance including constituent valves both for the cultivators 8 and 10, whereby to raise or lower the cultivator 10 in an amount and direction of the movement thereof corresponding to the amount and direction of the maneuvering operation.

Figure 4:
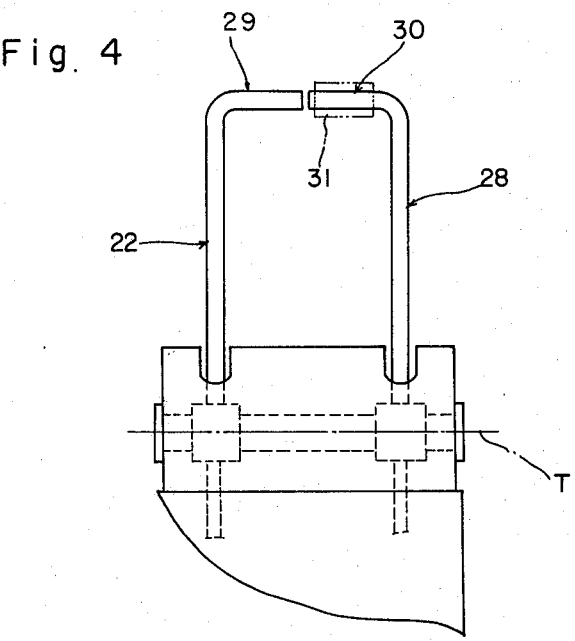
FIG. 4 is an enlarged rear end view of raising-and-lowering operating means for the tractor.

The raising-and-lowering operating means 22, 28 are each journaled for free pivotal rocking around a common transverse axis T as shown in FIG. 4, each being constructed in inverted-L shape with the horizontal sides of the L serving as grips 29, 30, respectively, of sufficient length with free ends thereof opposing each other in close proximity to be gripped and operated together in one hand but allowing capable of being gripped separately and independently of each other, thus enabling regulation of the levels of the first and the second cultivators 8 and 10 independently of each other when separate proper readjustment is required to follow field undulations, on the one hand, and also to effect rapid simultaneous lifting of both of the cultivators 8, 10 when passing over a dyke or the like, on the other hand.

Though oil hydraulic cylinders 14 and 15 are illustrated and described as the means for power-driving the lift arms 19 and 24, respectively, any other suitable power-driving means may be used for this purpose, for instance, by pivotally providing a nut means on each lift arm 19 or 24 and hydraulically or electrically rotating a threaded rotary shaft in screw thread engagement with the nut means, thus providing similar rocking of the lift arm 19 or 24 around the axis R or S. As for the opposing grips 29 and 30, it may be preferable to provide over one of them a slidable sleeve member 31 as illustrated in phantom in FIG. 4, to connect the grips 29 and 30 together slid to bridge them up, thus facilitating the operation by one hand.

Figure 5:
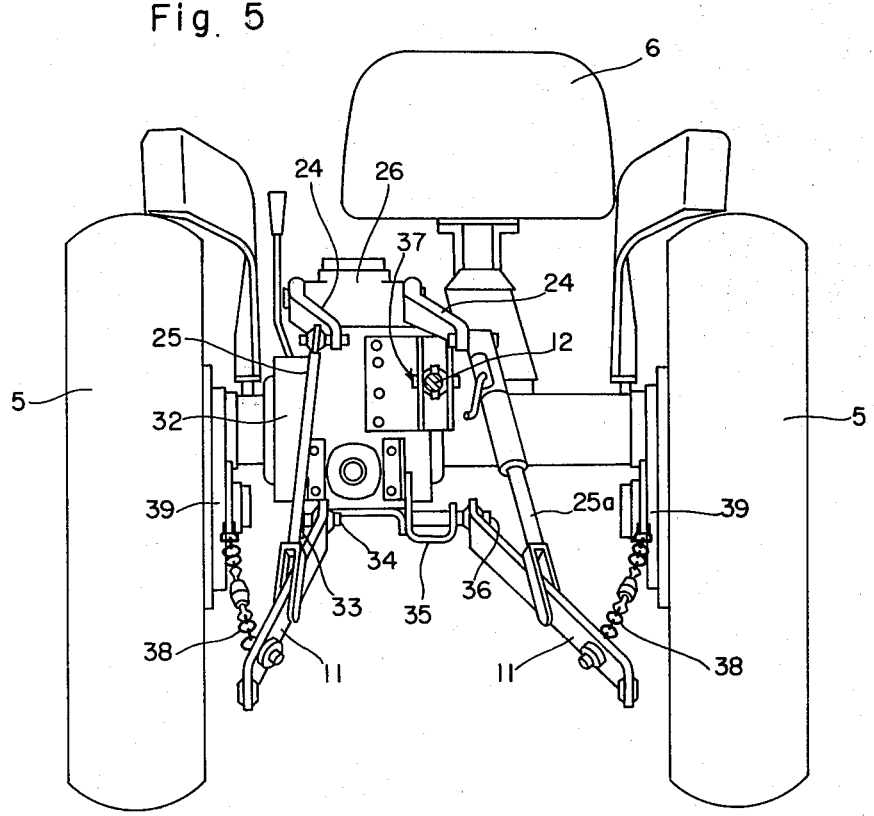
FIG. 5 is a rear end view of the tractor showing the mounting of lower links and a top link.

With particular reference to FIG. 5, a first bracket 33 is affixed to a bottom plate of the transmission gearing case 32, on the lateral side remote from the operator's seat 6, and a first pivot 34 is provided to extend from the first bracket 33 inwardly to the center of the tractor. On the other hand, a second bracket 35 of U-shape or J-shape in profile as viewed in the longitudinal direction of the tractor is affixed to the lateral flank of a rearward extension or projection of the transmission gearing case 32, on the side nearer to the operator's seat 6, and a second pivot 36 extends from the second bracket 35 in the same direction as the first pivot 34. Furthermore, pivot means 37 for the top link 12 is affixed on the rear face of the transmission gearing case 32 at the lateral end portion thereof substantially corresponding to the lateral center of the tractor.

The lift arms 24 to hold the lower links 11 are each inclined to extend to the side near the operator's seat 6. The two lower links 11 are disposed with rear ends thereof, to be attached to the second cultivator 10, substantially equidistantly apart from the longitudinal center line of the tractor so as to trail the second cultivator 10 in good longitudinal alignment with the tractor; thus of the two lower links 11 the one pivoted on the first pivot 34 is inclined with respect to the longitudinal at an angle smaller than the angle of inclination of the other power link 11 pivoted on the second pivot 36.

There is provided a check chain 38 to interconnect each of the lower links 11 and respective adjacent rear wheel transmission gearing cases 39.

In the illustrated embodiment, one of the connecting rods 25a is constructed to be of adjustable length so that the second cultivator 10 may be kept in proper horizontal working position during the working travel of the tractor even when the tractor is transversely inclined with the wheels 4, 5 on one lateral side treading for instance on a dyke, simply by readjusting the length of the connecting rod 25a.

Figure 6:
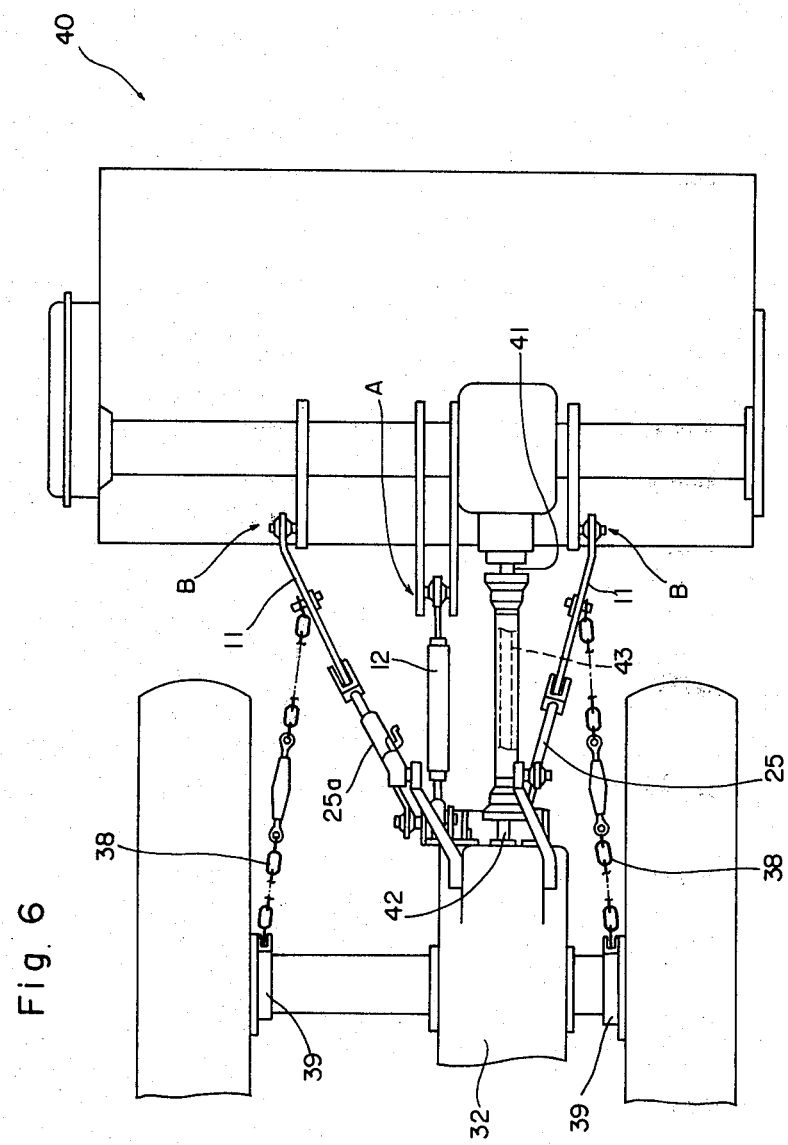
FIG. 6 is a plan view showing the portion where a rotary cultivating implement is attached to the tractor.

FIG. 6 shows a rotary cultivating implement 40 attached to the tractor in such manner that location A of the attachment joint for receiving the top link 12 is substantially in the vertical longitudinal center plane of the tractor and locations B of the attachment joints on either lateral side for receiving the lower links 11 are substantially symmetrical with respect to the center plane. Rotary input shaft 41 of the implement 40 to provide power is offset to one lateral side of the longitudinal center line of the implement 40, so that when the implement 40 is attached to the tractor, as illustrated, the rotary input shaft 41 may extend in substantial longitudinal alignment with the power-taking-off shaft 42 rearwardly extending from the transmission gearing case 32, and thus the input and power-taking-off shafts 41, 42 as well as a transmission shaft 43 operatively interconnecting the same may form a continuous straight line, in plan view as shown in FIG. 6, parallel to the longitudinal center line of the tractor.

Figure 2:
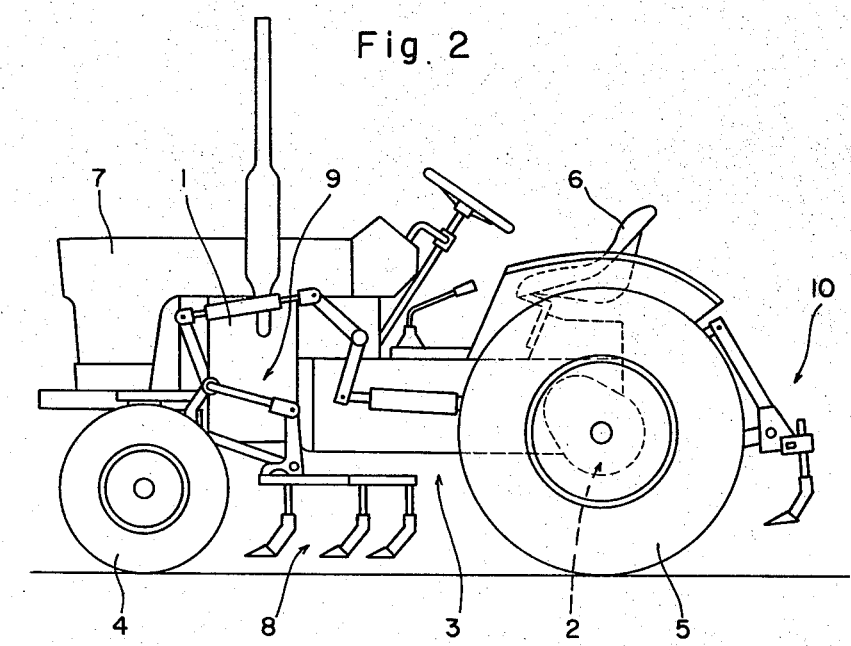
FIG. 2 is an overall side elevation view of the tractor shown in FIG. 1.

In FIGS. 1-3, the first and the second implements 8, 10 have been shown both as cultivators. However, the first and the second implements 8, 10 may not only be both of the same kind as in the illustrated embodiment but also be of different kinds. For instance, it may be preferable to provide a weed-cutting mower as the first implement 10 or rather 40 as in FIG. 6, since the tractor may then perform the work of first cutting weeds or the like and then cultivating the soil, thus avoiding entanglement of the standing weeds or the like to the cultivating implement to the best possible degree.

We claim:

1. An offset type tractor comprising a pair of left and right front wheels, a pair of left and right rear wheels, and front wheels and the rear wheels having a common longitudinal center line, a main frame unit offset to one lateral side of said longitudinal center line and having a prime mover assembly on a forward portion thereof and a transmission on a rearward portion thereof, an operator's seat mounted on a side of the main frame unit adjacent said longitudinal center line, a first working implement mounted between the front and rear wheels and offset relative to the main frame unit toward the longitudinal center line, and a second working implement mounted rearwardly of the rear wheels and offset relative to the main frame unit toward the longitudinal center line, front hydraulic means disposed on a longitudinal intermediate portion of the main frame unit and on a side thereof opposite the operator's seat, front rod means disposed on an upper and longitudinally intermediate portion of the main frame unit to extend transversely through left and right sides thereof and adapted to be rotatable by the action of said front hydraulic means, lift arm means connected to left and right ends of said front rod means for raising and lowering said first working implement, rear hydraulic means mounted in a cylinder housing disposed over said transmission, rear rod means disposed on an upper rearward portion of the main frame unit to extend transversely through the left and right sides thereof and adapted to be rotatable by the action of said rear hydraulic means, laterally inclined lift arm means connected to left and right ends of said rear rod means for raising and lowering said second working implement, each of said lift arm means extending rearwardly and towards said center line, and raising and lowering operating means operable independently of said front and rear hydraulic means whereby said first and second working implements are separately operable.

2. The tractor as claimed in claim 1 further comprising:

a power-take-off shaft extending rearwardly toward said second working implement from a rear end of said main frame unit, two link members attached to the rear of said main frame unit on left and right sides thereof, respectively, a third link member attached to the rear end of the main frame unit and disposed on said longitudinal center line, and three link members being inclined at different respective angles to the main frame unit to locate the second working implement substantially at the center of the tractor in the direction of the width of the tractor, and a rotary input shaft extending forwardly toward the main frame unit from the second working implement and operatively connected to said power-take-off shaft.

3. The tractor of claim 2 wherein said second implement is a rotary cultivating implement.

4. The tractor of claim 2 wherein said front hydraulic means for the first implement comprises a hydraulic cylinder.

5. The tractor of claim 1 wherein said raising and lowering operating means comprises two adjacent handle members with opposed grips capable of being operated independently or simultaneously by one hand of the operator.

6. The tractor of claim 5 wherein said handle members are of inverted L-shape and said opposed grips are the horizontal sides of the L and extend into aligned close proximity to one another.

7. The tractor of claim 6 comprising sleeve means slidable on said grips to couple the same together for selected common movement.

* * * * *